United States Patent Office.

OBADIAH RICH, OF CAMBRIDGE, MASSACHUSETTS, ASSIGNOR TO PETER COOPER, OF NEW YORK, N. Y.

IMPROVEMENT IN PREPARING GLUE-STOCK.

Specification forming part of Letters Patent No. 18,724, dated November 24, 1857.

*To all whom it may concern:*

Be it known that I, OBADIAH RICH, of Cambridge, in the county of Middlesex and State of Massachusetts, have invented an Improvement in Preparing Glue-Stock for Making Glue; and I do hereby declare that the following is a full and exact description of the process and mode of conducting the same.

The method heretofore used in the manufacture of glue for the removal of the blood, fat, hair, and other impurities from their stock or "glue-pieces" previous to boiling the same into glue is to digest them for a long time in lime and water, or milk of lime. As lime is slightly soluble in water it requires from three to six months, and in some cases a longer time, to effect the perfect separation of foreign matter from the skin. After the pieces have been sufficiently limed they are repeatedly and thoroughly washed, or allowed to remain exposed to the atmosphere, (being turned frequently,) for the purpose of neutralizing the lime, which is converted into a carbonate of lime by absorption of carbonic acid from the atmosphere. This part of the process—viz., the removal of lime by washing and exposure to the air, and the conversion, by one or both of these means, of the caustic lime to a carbonate—is necessary, as the lime would otherwise cause the glue to be of inferior quality. By my improvement a superior quality of glue is produced, and a great saving of time and labor also results from it.

I arrange several vats of suitable size and form near to each other, and between two or three of the first ones of the series I place sloping tables or inclined planes in such a position that the solution used may run back into the vats when the wet pieces are laid upon them. Into the first and second vats I put a solution of caustic soda or potash, its strength by the hydrometer being about 3° Baumé; or if the pieces to be operated upon are very dry and hard the strength of the solution may be about 5° to 6° Baumé. The hides or glue-pieces are now placed in the solution and digested for two or three days, or until the hair will come off readily, and the purification is sufficiently effected. The time required for this part of the process will vary according to the thickness of the skin and the time it has remained in a dry state. The pieces are now to be placed upon the inclined platform, the alkaline liquor drained from them and conducted into the vat, and if the impurities above named are removed no further treatment with the alkali will be needed. If the pieces require more preparation, they are placed in the second vat, in which the solution is of about the same strength as that in the first one used. They may remain in this about one day, are then drained, as before, and placed in vats containing pure water for a day or two. This water should be changed several times; or, if convenient, this washing may be done in running water. I now fill a vat with dilute sulphuric or hydrochloric acid, in strength about 1° Baumé, and allow the pieces to remain in it about twenty-four hours, or until all the alkali in them is neutralized by the acid. They are now to be removed from the dilute acid and well washed, after which they are ready to be boiled and converted into glue in the usual manner.

While it is desirable that the alkaline and acid solutions be neither too strong (as thereby the gelatine is injured) nor too weak, (as thereby the process would be unnecessarily tedious,) I do not restrict myself to the strength that I have mentioned above. I have found that, as a matter of practice, with the proportions heretofore given the best results are obtained.

The advantage of using either the potash or the soda is due in a great degree to their greater solubility, lime being but slightly soluble, whereas the soda or potash is dissolved freely, and consequently permeates the pieces or hides in much less time, and also these alkalies exert a more decided and efficient action than lime upon the blood, fat, and other substances, which must be removed from the pieces or stock in order to obtain a good quality of gelatine.

By the above process I have prepared dry Calcutta hide in five days, which, on boiling, has yielded sixty-nine per cent. of glue.

The first part of my invention, therefore, consists in the use of soda or potash instead of lime, as heretofore employed, for the purpose of removing the blood, hair, and other impurities from the stock or glue-pieces previous to boiling the same into glue; and the second part of my invention consists in the use of a mineral acid for the purpose of neutralizing the soda or potash employed to remove the blood, hair, and other impurities from the stock or glue-pieces.

What I claim, and desire to secure by Letters Patent, is—

1. The cleansing of glue-stock pieces and preparing them for the manufacture of glue by the use of soda or potash, as herein set forth.

2. In combination with the above, the use of a mineral acid for the purpose of effectually removing and neutralizing the alkali in the stock so prepared, substantially as herein set forth.

OBADIAH RICH.

In presence of—
T. L. BATCHELDER,
SAML. BATCHELDER, Jr.